Oct. 12, 1937.  J. SANTSCHI  2,095,349
SAFETY DEVICE FOR ENGINES
Filed Oct. 25, 1934
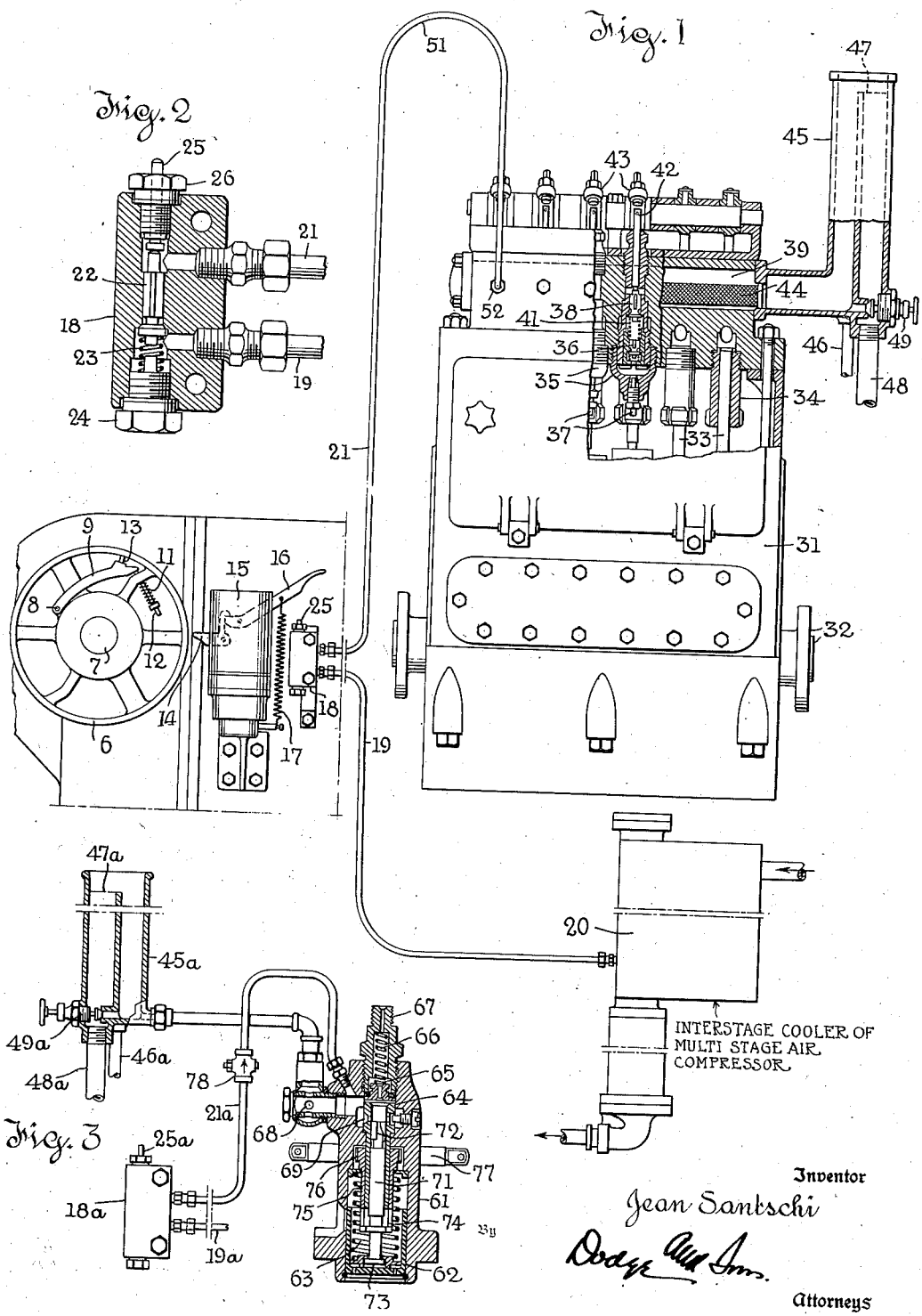
Inventor
Jean Santschi
Attorneys Patented Oct. 12, 1937

2,095,349

UNITED STATES PATENT OFFICE 2,095,349

SAFETY DEVICE FOR ENGINES

Jean Santschi, Milwaukee, Wis., assignor to Nordberg Manufacturing Company, Milwaukee, Wis., a corporation of Wisconsin Application October 25, 1934, Serial No. 750,014

7 Claims. (Cl. 123—140)

This invention relates to safety stop mechanisms, and particularly to safety stops for Diesel and other internal combustion engines in which fuel is supplied to the cylinders by pumps.

It has been the usual practice to provide a device driven by the engine and arranged to function at a critical excess speed to trip a latch. The tripping of the latch permitted a weight to shift the fuel pump controller to a position in which the pump was inoperative. As the fuel pump and latch mechanism were usually located far apart, this required long and inconvenient mechanical connections between the latch and the fuel pump controller. These connections were in the way, unsightly and subject to derangement.

Another objection to the prior art arrangement is the fact that it acts through the same control mechanism as does the ordinary governor. When an engine runs away, the cause is commonly some derangement of the control mechanism. For example, if the control mechanism is stuck so that the governor does not properly shift it, there is serious risk that the weight when released by the safety stop may also fail to shift it. In such case the safety stop would fail to function because of the very condition that caused the engine to run away.

The present invention provides a simple device in which the tripping of the latch opens a valve. The opening of the valve admits air under moderate pressure (usually 5 to 10 pounds gage) to the intake manifold of the fuel pump. The resulting immediate displacement of fuel oil from such manifold puts the fuel pump out of action and stops the engine. In this device a simple pipe leading from the air valve to a connection already present in commercial oil pumps, takes the place of all mechanical connections, and the fuel pump controller is freed from the special weight-actuated connections heretofore used. The controller takes no part in the stopping operation and if stuck cannot defeat the stopping of the engine.

In an air injection Diesel engine the necessary air can conveniently be derived from the first stage of the compressor which furnishes injecting air. When air starting is used air may be taken at reduced pressure from the starting bottle. Scavenging air is seldom at sufficient pressure. Any source offering adequate pressure may be used, it being practicable to provide a small compressor and accumulator specially for this purpose.

Two illustrative embodiments, using different types of fuel pump will now be described with reference to the accompanying drawing, in which,—

Fig. 1 is a diagrammatic elevation of the safety stop trip pneumatically connected with a six plunger fuel oil pump for a six cylinder air injection Diesel engine. Parts are broken away to show the construction.

Fig. 2 is an axial section through the air valve.

Fig. 3 is a view similar to a portion of Fig. 1 and illustrating the invention applied to fuel feeding pump of another type.

Referring first to Figs. 1 and 2, 6 represents the rotary element of the safety stop, here shown as a wheel. It is mounted on a shaft 7 which may be the crank shaft or the cam shaft of the engine, or any shaft driven thereby. Pivoted at 8 on wheel 6 is an arm 9 urged outward by centrifugal force and held in throughout the normal speed range of the engine by a coil compression spring 11 which encircles the rod 12 connected with arm 9.

The arm 9 has a finger 13, which may be projected through an opening in the rim of wheel 6. Spring 11 is of such strength that at a critical speed, slightly above normal engine speed, the spring is overpowered by the centrifugal force developed by arm 9. The arm 9 then swings outward and finger 13 projects beyond the rim of wheel 6 far enough to strike trigger 14 of a latch mechanism in housing 15. The shifting of trigger 14 releases arm 16 which is then drawn down by spring 17.

The mechanism so far described will be recognized as the trip mechanism of a well-known safety stop. In that device, as heretofore constructed, arm 16 is connected by a cable with the control member of the fuel pump, but according to the present invention the descent of arm 16 is caused to open an air valve.

The body of the air valve is indicated at 18. To this a supply line 19 leads from any suitable source of air preferably under pressure of 5 to 10 pounds gage. In Fig. 1 it is shown connected to the air passage of the first interstage cooler 20 of the multistage compressor which supplies fuel injecting air. From body 18 a line 21 leads to the supply manifold of the fuel pump hereinafter described.

In body 18 (see Fig. 2) is a seat for the downwardly opening check valve 22 urged closed by supply pressure and by coil compression spring 23 which is interposed between the valve and a combined spring seat and closure plug 24 threaded into body 18. A plunger 25 guided in a plug 26, also threaded into body 18, engages the upper end of valve 22 and projects above plug 26 into the path of lever 16.

The descent of lever 16 when released by the actuation of trigger 15, opens valve 22 and allows air to flow from supply line 19 to line 21.

A multiple unit fuel pump of the type manufactured by the inventor's assignee is indicated generally by the numeral 31. The drive shaft 32 of the pump is driven by the engine which it serves, and carries cams (not shown) which reciprocate in suitably timed relation, a series of pump plungers 33, one for each engine cylinder. Four such plungers are visible, and each works in a corresponding pump cylinder 34.

In front of each pump cylinder is a related valve cage 35, one of which appears in section in Fig. 1. In each cage 35 is a discharge check valve 36 through which displaced oil flows to a connection 37 and thence to the injection valve of the corresponding engine cylinder. Above each discharge valve is an inlet valve 38 also of the check type through which oil flows from the manifold 39 to the pump cylinder. Valves 38 are urged closed by compression springs 41 and are held open through variable portions of the discharge strokes of respective plungers 33 by push rods 42 which are depressed by rockers 43. The mechanism which actuates rockers 43 is controlled by the engine governor (not shown), and by varying the portion of the pump stroke through which the inlet valve is held open, varies the quantity of oil fed per stroke to the engine cylinders.

The pump 31 is a multiple unit pump of the variable spill-back type extensively used in the art, and no novelty is here claimed for it. Hence it need not be described in great detail.

The fuel supply manifold 39 receives fuel oil through screen 44 from a short stand pipe 45. Oil is supplied to stand pipe 45 through pipe 46 at a rate slightly in excess of the maximum demand. The excess flows over the dam 47 and returns by pipe 48 to the supply. The valve 49 is provided to drain the manifold and normally is closed.

The pipe 21 leading from the air valve is carried in an inverted U 51 above the top of stand pipe 45 and then down to connection 52 which leads to the interior of manifold 39. The inverted U 51 is to keep pipe 21 free of oil.

The opening of valve 22 by the safety stop admits air to manifold 39. The air displaces the oil from the manifold and stops the engine by terminating the fuel feed. The displaced oil merely flows over the dam 47 back to supply. Even if the oil be not completely displaced, the entry of air into the pumps puts them out of action.

In Fig. 3 the invention is shown applied to another type of fuel pump, namely that manufactured by Robert Bosch. Parts essentially the same as those shown in Fig. 1 have the same reference numeral with the character a.

A single pump, for a single engine cylinder is illustrated. The pump body is illustrated at 61. Guided in this is an actuating cross head 62 urged downward by spring 63 and intended to be forced upward by a part of the engine which reciprocates in proper timed relation to the rotation of the crank shaft.

The pump cylinder 64 is mounted in body 61 and has at its upper end the discharge valve 65 with spring 66. Valve 65 is of the check type and prevents reflux from the discharge connection 67 which is connected to the fuel injecting device of the engine.

The supply connection 68 for fuel oil is fed from stand pipe 45a and from it an inlet port 69 leads through the side of cylinder 64. This port is controlled by the end 72 of pump plunger 71 which is specially formed to serve as a spill back valve, the amount of spill back being varied by turning the plunger about its longitudinal axis.

To permit this adjustment plunger 71 is swiveled on crosshead 62 at 73 and is splined at 74 to sleeve 75. A gear 76 integral with sleeve 75 meshes with a rack 77 which is guided in pump body 61.

The engine governor (not shown) controls the position of rack 77 and thus by regulating the spill back, regulates the quantity of oil fed by the pump at each stroke.

A check valve 78 is indicated in line 21a and closes against flow from the supply connection 68 toward valve 18a. This performs the same function as loop 51, that is, it prevents fuel oil from flowing to valve 18a. Either arrangement may be used but the loop 51 is considered to be simpler and probably more certain in action.

The structure of Fig. 3 operates in the same manner as that shown in Fig. 1, so far as stopping by displacing oil from the pump supply connection is concerned.

While the use of compressed air has been described, and is preferred because air is readily available, other suitable gases if available under pressure can be used.

The trip mechanism illustrated is conventional and is intended to be typical. The same is true of the air valve. The invention may be applied to any fuel pump whose construction and supply connections permit the displacement of fuel oil by a compressed gas.

What is claimed is,—

1. The combination of a fuel pump for supplying measured charges of liquid fuel to the working space of an internal combustion engine, said fuel pump including a supply passage; a normally closed valve for admitting a gas under pressure to said supply passage, said gas when admitted serving to displace fuel from said passage, said gas being incapable of serving as a motive fuel for the engine; and means responsive to engine speed and arranged to open said valve at a critical speed in excess of the normal speed of the engine.

2. The combination of a fuel pump for feeding measured charges of fuel oil to the working space of an internal combustion engine, said pump including a fuel supply passage; means including a standpipe provided with an overflow, said standpipe serving to supply fuel to said passage under moderate pressure head; a normally closed valve for supplying gas under pressure to said passage to displace fuel therefrom against said pressure head, said gas being incapable of serving as a motive fuel for the engine; and means responsive to engine speed and arranged to open said valve at a critical speed in excess of the normal speed of the engine.

3. The combination of a pump arranged to supply measured charges of liquid fuel to the working space of an internal combustion engine, said pump including a supply passage; means for controlling said pump to vary the measured charge delivered thereby; a normally closed valve controlling a supply of gas under pressure to said supply passage, said gas when admitted to the passage displacing fuel therefrom; said gas being incapable of serving as a motive fuel for the engine; and means responsive to engine speed and arranged to open said valve when engine speed exceeds a chosen critical value.

4. The combination of a fuel pump for supplying measured charges of liquid fuel to the working space of an internal combustion engine, said fuel pump including an inlet valve and a supply passage leading thereto; means for normally supplying liquid fuel to said supply passage; and means responsive to abnormal operation of the engine for terminating the supply of fuel to said supply passage by the displacing action of a gas, said gas being incapable of serving as a motive fuel for the engine.

5. The combination of a plurality of fuel pumps for supplying measured charges of fuel to the various working spaces of a multiple cylinder internal combustion engine, said fuel pumps having a common supply passage for liquid fuel; a normally closed valve for admitting a gas under pressure to said supply passage, said gas when admitted serving to displace fuel from said passage and being incapable of serving as a motive fuel for the engine; and means responsive to engine speed and arranged to open said valve at a critical speed in excess of the normal speed of the engine.

6. The combination of a plurality of fuel pumps for feeding measured charges of fuel oil to the various working spaces of a multiple cylinder combustion engine, said pumps including a supply passage common to all the pumps for supplying fuel oil thereto; means including a standpipe provided with an overflow, said standpipe serving to supply fuel to said passage under moderate pressure head; a normally closed valve for supplying gas under pressure to said passage to displace fuel oil therefrom against said pressure head, said gas being incapable of serving as a motive fuel for said engine; and means responsive to engine speed and arranged to open said valve at critical speed in excess of the normal speed of the engine.

7. The combination of a fuel pump for supplying measured charges of liquid fuel to the working space of an internal combustion engine, said fuel pump including a supply passage; and normally inactive means arranged to be rendered active by abnormal operation of the engine to admit gas under pressure to said supply passage, said gas being incapable of serving as a motive fuel for said engine, and the admission of said gas to the supply passage serving to completely suspend the fuel pumping operation of the pump.

JEAN SANTSCHI.